US012568423B2

(12) United States Patent

Vegas et al.

(10) Patent No.: US 12,568,423 B2

(45) Date of Patent: Mar. 3, 2026

(54) RADIO DISCOVERY FOR A MESH ACCESS POINT (AP)

(71) Applicant: Cisco Technology, Inc., San Jose, CA (US)

(72) Inventors: Thomas Vegas, Gland (CH); Loris Gazzarrini, Lausanne (CH); Anirban Karmakar, Ecublens (CH); Vincent Cuissard, Haute-Savoie (FR)

(73) Assignee: Cisco Technology, Inc.

( * ) Notice: Subject to any disclaimer, the term of this patent is extended or adjusted under 35 U.S.C. 154(b) by 756 days.

(21) Appl. No.: 17/933,111

(22) Filed: Sep. 18, 2022

(65) Prior Publication Data

US 2024/0098621 A1   Mar. 21, 2024

(51) Int. Cl.
*H04W 40/24* (2009.01)
*H04W 84/18* (2009.01)

(52) U.S. Cl.
CPC .......... *H04W 40/246* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 10,383,030 | B2 * | 8/2019 | Jing | H04L 12/2807 |
| 10,785,809 | B1 * | 9/2020 | Thubert | H04W 40/246 |

| | | | | |
|---|---|---|---|---|
| 2004/0187030 | A1 * | 9/2004 | Edney | H04L 61/10 726/13 |
| 2005/0265372 | A1 * | 12/2005 | Bae | H04W 76/10 370/431 |
| 2010/0115272 | A1 * | 5/2010 | Batta | H04L 45/566 713/162 |
| 2012/0087281 | A1 | 4/2012 | Rahman et al. | |
| 2012/0195288 | A1 * | 8/2012 | Oh | H04W 36/144 370/331 |
| 2014/0071850 | A1 | 3/2014 | Abraham et al. | |
| 2016/0007273 | A1 * | 1/2016 | Farid | H04W 48/16 370/329 |
| 2016/0373993 | A1 * | 12/2016 | Luo | H04W 8/18 |
| 2017/0201979 | A1 * | 7/2017 | Murphy | H04L 41/0654 |
| 2017/0346729 | A1 | 11/2017 | Pang et al. | |
| 2019/0312784 | A1 * | 10/2019 | Altay | H04L 41/122 |
| 2023/0164666 | A1 * | 5/2023 | Van Oost | H04W 40/246 370/254 |

FOREIGN PATENT DOCUMENTS

WO       2022019265 A1    1/2022

* cited by examiner

*Primary Examiner* — Brian S Roberts

(74) *Attorney, Agent, or Firm* — Merchant & Gould P.C.

(57) ABSTRACT

Radio discovery for a mesh Access Point (AP) may be provided. Topology information associated with a first network may be received wherein the first network may comprise a mesh network. A Topology Descriptor Message (TDM) may then be created based on the topology information. The TDM may then be transmitted by a first Access Point (AP).

20 Claims, 3 Drawing Sheets

200

205

Start

210

Receive topology information associated with a first network wherein the first network comprises a mesh network

220

Create a topology descriptor message (TDM) based on the topology information

230

Transmit, by a first access point (AP), the TDM

240

End

RADIO DISCOVERY FOR A MESH ACCESS POINT (AP)

TECHNICAL FIELD

The present disclosure relates generally to radio discovery for a mesh Access Point (AP).

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
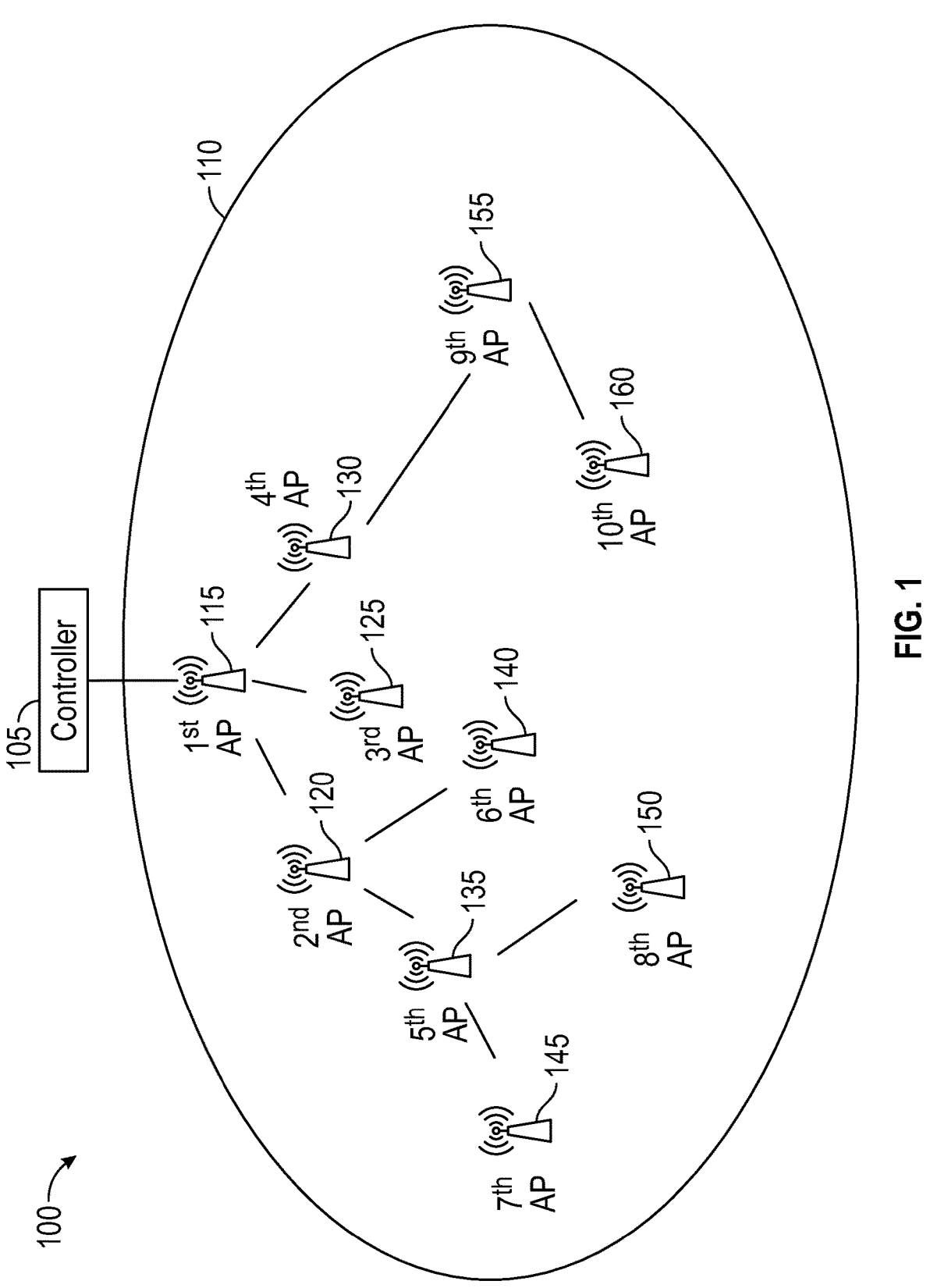
FIG. 1 is a block diagram of an operating environment for providing radio discovery for a mesh Access Point (AP)

Radio discovery for a mesh Access Point (AP) may be provided. Topology information associated with a first network may be received wherein the first network may comprise a mesh network. A Topology Descriptor Message (TDM) may then be created based on the topology information. The TDM may then be transmitted by a first Access Point (AP).

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A wireless mesh network may comprise a mesh network created through the connection of wireless AP nodes installed throughout a coverage area. The networking infrastructure may be decentralized and simplified because each AP need only transmit as far as the next node.

When bringing up a mesh AP, or after a reboot of a mesh AP, it may be difficult for the mesh AP to locate a radio channel where a valid mesh parent AP may be available. Often a scanning phase (i.e., broadcast) on a 5 GHz radio and a 2.4 GHz radio, followed by a seeking phase (i.e., unicast) may be needed. This process may be repeated on many channels, which may make the overall information gathering procedure last a long time (e.g., minutes). Also new mesh APs may not be aware of the Bridge Group Name (BGN) they belong to and may have to try to authenticate and fail to multiple mesh networks before finding the one that may accept it. Embodiments of the disclosure may provide a process to remove the mesh scanning and seeking phase. Accordingly, embodiments of the disclosure may provide a process to advertise, for example, the Media Access Control (MAC) addresses of APs to join with their expected parent APs and their channel to accelerate the onboarding phase. Consequently, embodiments of the disclosure may provide a process to distribute topology information in a Wi-Fi mesh network that may reduce the amount of time required to: i) converge upon link loss; and ii) find a parent AP and join a controller for the first time.

FIG. 1 shows an operating environment 100 for providing radio discovery for a mesh AP. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN) for client devices. The plurality of APs may comprise a first AP 115, a second AP 120, a third AP 125, a fourth AP 130, a fifth AP 135, a sixth AP 140, a seventh AP 145, an eighth AP 150, a ninth AP 155, and a tenth AP 160. Coverage environment 110 may comprise an outdoor or indoor wireless environment, such as a mesh (e.g., a Wi-Fi mesh).

As described in greater detail below with respect to FIG. 2, first AP 115 may comprise a parent AP of second AP 120, third AP 125, and fourth AP 130. Second AP 120 may comprise a parent AP of fifth AP 135 and sixth AP 140. Fifth AP 135 may comprise a parent AP of seventh AP 145 and eighth AP 150. Fourth AP 130 may comprise a parent AP of ninth AP 155 that may comprise a parent AP of tenth AP 160.

The plurality of APs may provide wireless network access to a plurality of client devices (not shown) as the plurality of client devices move within coverage environment 110. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, or other similar microcomputer-based device. Each of the plurality of APs may be compatible with specification standards such as, but not limited to, the Institute of Electrical and Electronics Engineers (IEEE) 802.11 specification standard for example.

Controller 105 may comprise a Wireless Local Area Network controller (WLC) and may provision and control coverage environment 110 (e.g., a WLAN). Controller 105 may allow the plurality of client devices to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide radio discovery for a mesh AP.

The elements described above of operating environment 100 (e.g., controller 105, first AP 115, second AP 120, third AP 125, fourth AP 130, fifth AP 135, sixth AP 140, seventh AP 145, eighth AP 150, ninth AP 155, and tenth AP 160) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
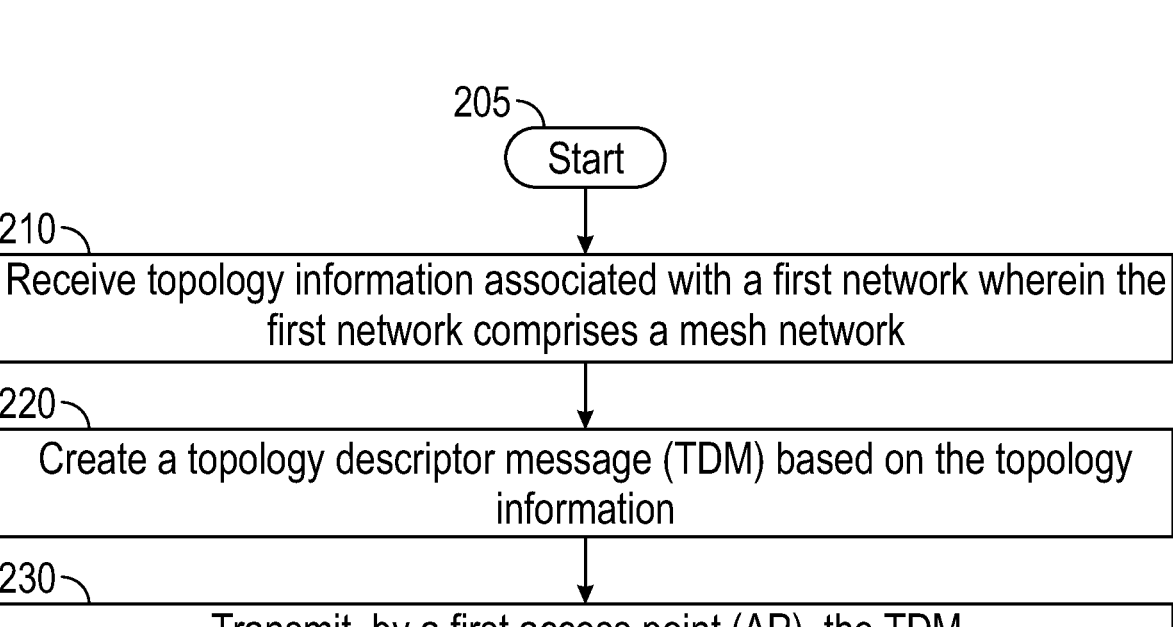
FIG. 2 is a flow chart of a method for providing radio discovery for a mesh AP.

FIG. 2 is a flow chart setting forth the general stages involved in a method 200 consistent with embodiments of the disclosure for providing radio discovery for a mesh AP. Method 200 may be implemented using a computing device 300 as described in more detail below with respect to FIG. 3. Computing device 300 may be disposed in first AP 115 for example. Ways to implement the stages of method 200 will be described in greater detail below.

Method 200 may begin at starting block 205 and proceed to stage 210 where computing device 300 may receive topology information associated with a first network (e.g., coverage environment 110) wherein the first network may comprise a mesh network. For example, Control and Provisioning of Wireless Access Points (CAPWAP) protocol may comprise a standard, interoperable networking protocol that may enable controller 105 to manage the plurality of APs. CAPWAP joined mesh APs may be provided with a full topology description from controller 105.

The topology description (i.e., topology information) may include various radio Media Access Control (MAC) addresses that may be provisioned on controller 105, listing the APs that may be allowed to join controller 105. This listing may include any one or more of the plurality of APs. To limit the airtime for transmitting topology details, embodiments of the disclosure, for example, may only include the MAC addresses of APs that are not joined currently, and/or that just disjoined. MAC addresses may be mapped with a preference list of the mesh Basic Service Set Identifiers (BSSIDs) via decision logic in controller 105 for example. This may be referred to as a MAC Preference List (MPL). For each AP's MAC in the MPL, the various channels used and optionally the type of antennas known for each AP may be included. The topology description (i.e., topology information) may also include Control Channels (CCs) and Set Channels (SCs) with the next expected transmission time to help a mesh AP to perform targeted and short off-channel processes for finding a better node as described in greater detail below.

From stage 210, where computing device 300 receives topology information associated with the first network (e.g., coverage environment 110), method 200 may advance to stage 220 where computing device 300 may create a Topology Descriptor Message (TDM) based on the topology information. For example, the TDM may be created on a pre Bridge Group Name (BGN). The TDM may be kept up-to-date by controller 105 using, for example, a configuration or an operational state revision number and an expiration time (e.g., in seconds).

Once computing device 300 creates the TDM based on the topology information in stage 220, method 200 may continue to stage 230 where computing device 300 may transmit (e.g., via first AP 115) the TDM. For example, the TDM may be transmitted on CCs and SCs as described above. The CC may comprise a hardcoded channel (e.g., one CC for 2.4 GHz and one CC for 5 GHz) where the plurality of APs may occasionally receive and transmit the TDM. The SCs may comprise channels that the APs are already communicating with other APs on.

Each of the plurality of APs may send its latest known topology version (e.g., via the TDM) on its wired interfaces. This may occur on an interval of approximately 1 second. Then each of the plurality of APs may send its latest known topology version (e.g., via the TDM) on its SC. This may occur on an interval of approximately 1 second to 5 seconds. When sending the TDM, the AP may updates/decreases the expiration time.

Periodically (e.g., every few seconds), off-channel capable APs (e.g., of the plurality of APs) may then transmit the TDM on the CC (e.g., slot 0 and slot 1). It may be costly in term of traffic loss to perform off-channel to transmit on the CC so the CC transmission may be performed less often than on the SC (e.g., on an interval of less than 10 seconds). Every AP (e.g., of the plurality of APs) with an additional off channel radio may set its channel on the CC and transmit on an interval of less than 1 second.

Any AP (e.g., of the plurality of APs), advertising its topology or not, upon receiving the TDM, may decide to broadcast it too, with the provided validity and revision number even if it is not the same network. This because there may be a common interest to shorten any discovery phase, because radio medium may be shared. To prevent advertising a MAC that may be too remote, embodiments of the disclosure may use a dissemination limitation process. For example, the TDM may include a "jump count" to be used as a Time to Live (TTL)-like value. For example, if jump count >0, a third party AP may pick a TDM and advertise it, decreasing the advertised jump count value. If the jump count <1, no AP may pick it and retransmit. Once computing device 300 transmits (e.g., via first AP 115) the TDM in stage 230, method 200 may then end at stage 240.

Embodiments of the disclosure may allow for an outsider AP to gain topology knowledge (i.e., aiding a new APs to join faster). For example, the new AP may listen on both: i) the wired; and ii) on the CCs (e.g., for approximately 10 seconds on both on the 2.4 GHz radio and on the 5 GHz radio). This may save a full scan on all interfaces. If the new AP does not find any topology information, the new AP may listen on various channels until it finds an SC on which the TDM is being sent. As soon as TDM is seen once, the new AP may stop. The new AP may directly try to associate to an AP that lists its own MAC in the received MPL as described above. This may ensure that a CAPWAP join may succeed provided the presence of multiple networks.

Embodiments of the disclosure may provide for roaming. For example, an AP may perform one off-channel scanning and gather Signal-to-Noise Ratio (SNR) information for a specific peer, using for example, any IEEE 802.11 frame that the peer may be currently transmitting. There may be no need for query/response, which makes the process faster. Once the mapping from the topology communicated SNR for a peer, versus actual SNR measured by off-channel is known, there may be no need for off-channel scanning, and the roaming decision may be taken at a later point even before changing channel.

Figure 3:
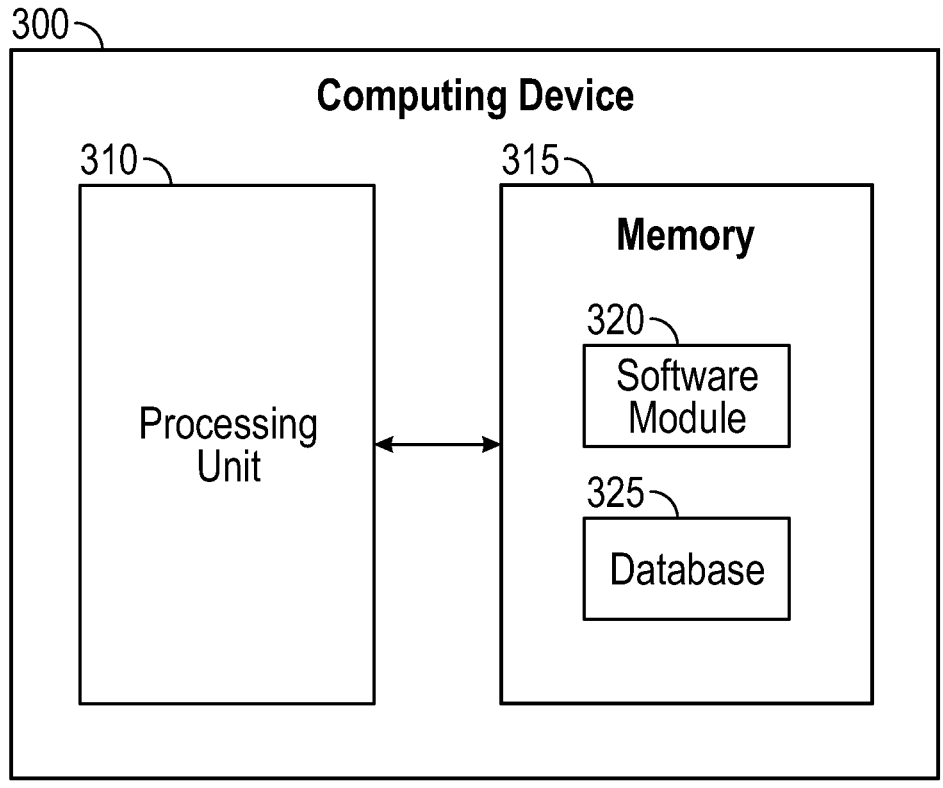
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing radio discovery for a mesh AP as described above with respect to FIG. 2. Computing device 300, for example, may provide an operating environment for controller 105, first AP 115, second AP 120, third AP 125, fourth AP 130, fifth AP 135, sixth AP 140, seventh AP 145, eighth AP 150, ninth AP 155, or tenth AP 160. Controller 105, first AP 115, second AP 120, third AP 125, fourth AP 130, fifth AP 135, sixth AP 140, seventh AP 145, eighth AP 150, ninth AP 155, or tenth AP 160 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

receiving topology information associated with a first network wherein the first network comprises a mesh network;

creating a Topology Descriptor Message (TDM) based on the topology information;

transmitting, by a first Access Point (AP), the TDM;

receiving, by a second AP, the TDM, wherein the second AP is in a second network; and transmitting, by the second AP, the TDM in response to dissemination limitation process.

2. The method of claim 1, wherein the topology information comprises Media Access Control (MAC) addresses of APs that are allowed to join the first network.

3. The method of claim 1, wherein transmitting, by the first AP, the TDM comprises transmitting the TDM on a Set Channel (SC).

4. The method of claim 1, wherein transmitting, by the first AP, the TDM comprises transmitting the TDM on a Control Channel (CC).

5. The method of claim 1, wherein transmitting, by the first AP, the TDM comprises transmitting the TDM on a wired interface.

6. The method of claim 1, wherein receiving the topology information comprises receiving the topology information from a controller of the first network.

7. The method of claim 1, wherein creating the TDM comprises creating the TDM on a per Bridge Group Name (BGN) basis.

8. A system comprising:

a first memory storage; and a first processing unit, the first processing unit disposed in a first Access Point (AP) and coupled to the first memory storage, wherein the first processing unit is operative to:

receive topology information associated with a first network, wherein the first network comprises a mesh network;

create a Topology Descriptor Message (TDM) based on the topology information; and transmit the TDM a second memory storage; and a second processing unit, the second processing unit disposed in a second AP and coupled to the second memory storage, wherein the second processing unit is operative to:

receive the TDM, wherein the second AP is in a second network, and transmit the TDM in response to dissemination limitation process.

9. The system of claim 8, wherein the topology information comprises Media Access Control (MAC) addresses of APs that are allowed to join the first network.

10. The system of claim 8, wherein the first processing unit being operative to transmit the TDM comprises the first processing unit being operative to transmit the TDM on a Set Channel (SC).

11. The system of claim 8, wherein the first processing unit being operative to transmit the TDM comprises the first processing unit being operative to transmit the TDM on a Control Channel (CC).

12. The system of claim 8, wherein the first processing unit being operative to transmit the TDM comprises the first processing unit being operative to transmit the TDM on a wired interface.

13. The system of claim 8, wherein the topology information comprises Media Access Control (MAC) addresses of APs that are allowed to join the first network.

14. The system of claim 8, wherein the first processing unit being operative to transmit the TDM comprises wherein the first processing unit being operative to transmit the TDM on a wired interface.

15. A non-transitory computer-readable medium that stores a set of instructions which when executed perform a method executed by the set of instructions comprising:

receiving topology information associated with a first network wherein the first network comprises a mesh network;

creating a Topology Descriptor Message (TDM) based on the topology information; and transmitting, by a first Access Point (AP), the TDM;

receiving, by a second AP, the TDM, wherein the second AP is in a second network; and transmitting, by the second AP, the TDM in response to dissemination limitation process.

16. The non-transitory computer-readable medium of claim 15, wherein creating the TDM comprises creating the TDM on a per Bridge Group Name (BGN) basis.

17. The non-transitory computer-readable medium of claim 15, wherein the topology information comprises Media Access Control (MAC) addresses of APs that are allowed to join the first network.

18. The non-transitory computer-readable medium of claim 15, wherein transmitting, by the first AP, the TDM comprises transmitting the TDM on a Set Channel (SC).

19. The non-transitory computer-readable medium of claim 15, wherein transmitting, by the first AP, the TDM comprises transmitting the TDM on a Control Channel (CC).

20. The non-transitory computer-readable medium of claim 15, wherein transmitting, by the first AP, the TDM comprises transmitting the TDM on a wired interface.

* * * * *